US012691381B2

(12) United States Patent
Matsuura et al.

(10) Patent No.: US 12,691,381 B2
(45) Date of Patent: Jul. 28, 2026

(54) COMPUTER-READABLE NON-TRANSITORY STORAGE MEDIUM HAVING GAME PROGRAM STORED THEREIN, GAME PROCESSING SYSTEM, GAME PROCESSING APPARATUS, AND GAME PROCESSING METHOD

(71) Applicant: NINTENDO CO., LTD., Kyoto (JP)

(72) Inventors: Ryuhei Matsuura, Kyoto (JP); Shiro Mouri, Kyoto (JP); Shigeyuki Asuke, Kyoto (JP); Hajime Nakao, Kyoto (JP); Ayano Masaki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 247 days.

(21) Appl. No.: 18/411,800

(22) Filed: Jan. 12, 2024

(65) Prior Publication Data

US 2024/0416240 A1 Dec. 19, 2024

(30) Foreign Application Priority Data

Jun. 16, 2023 (JP) ................................. 2023-099235

(51) Int. Cl.
| | |
|---|---|
| *A63F 13/577* | (2014.01) |
| *A63F 13/42* | (2014.01) |
| *A63F 13/44* | (2014.01) |

(52) U.S. Cl.
CPC ............ *A63F 13/577* (2014.09); *A63F 13/42* (2014.09); *A63F 13/44* (2014.09)

(58) Field of Classification Search
CPC ........ A63F 13/40; A63F 13/42; A63F 13/426; A63F 13/44; A63F 13/45; A63F 13/537; A63F 13/5372; A63F 13/5375; A63F 13/57; A63F 13/577; A63F 13/58; A63F 13/70; A63F 2300/306; A63F 2300/575; A63F 2300/63; A63F 2300/65
See application file for complete search history.

(56) References Cited

U.S. PATENT DOCUMENTS

| | | | |
|---|---|---|---|
| 11,836,301 B2 * | 12/2023 | Mounier | ................... G06T 7/20 |
| 12,437,460 B2 * | 10/2025 | Sakaki | ................ G06F 3/04815 |

(Continued)

FOREIGN PATENT DOCUMENTS

| | | |
|---|---|---|
| CN | 112121433 | 12/2020 |
| JP | 2008-043540 | 2/2008 |

(Continued)

OTHER PUBLICATIONS

"Path of Exile 1 Gameplay Help and Discussion"—"Group looting rules/etiquette"—"Forum—Path of Exile", Posted Nov. 27, 2013, pp. 1-2, accessed Nov. 3, 2025. (Year: 2013).*

(Continued)

*Primary Examiner* — Omkar A Deodhar
(74) *Attorney, Agent, or Firm* — Nixon & Vanderhye PC

(57) ABSTRACT

A first item is caused to appear in a virtual space on the basis of an operation input by a first player, and a player character is caused to acquire the first item on the basis of contact between a first player character and the first item. After a predetermined period has elapsed since the appearance of the first item, on the basis of contact between the first item and another player character operated by another player, the other player character is caused to acquire the first item.

20 Claims, 13 Drawing Sheets

(56)           References Cited

U.S. PATENT DOCUMENTS

| 2012/0249443 A1* | 10/2012 | Anderson | A63F 13/213 |
| | | | 345/173 |
| 2018/0093188 A1 | 4/2018 | Mabuchi et al. | |
| 2018/0204412 A1* | 7/2018 | Sjoberg | A63F 13/48 |
| 2020/0108308 A1* | 4/2020 | Shinoda | A63F 13/26 |
| 2020/0246704 A1 | 8/2020 | Oshino et al. | |
| 2023/0108566 A1* | 4/2023 | Marr | A63F 13/34 |
| | | | 463/29 |

FOREIGN PATENT DOCUMENTS

| JP | 2016-220847 | 12/2016 |
| JP | 2018-051195 | 4/2018 |
| JP | 2019-000171 | 1/2019 |
| JP | 7011612 B2 | 8/2020 |
| JP | 2020-166726 | 10/2020 |

OTHER PUBLICATIONS

Path of Exile (Year: 2013).*

* cited by examiner

FIG.6

OFFLINE MULTI-PLAY

SCREEN OF GAME APPARATUS (OPERATIONS OF CHARACTERS 200 AND 201)

FIG.12

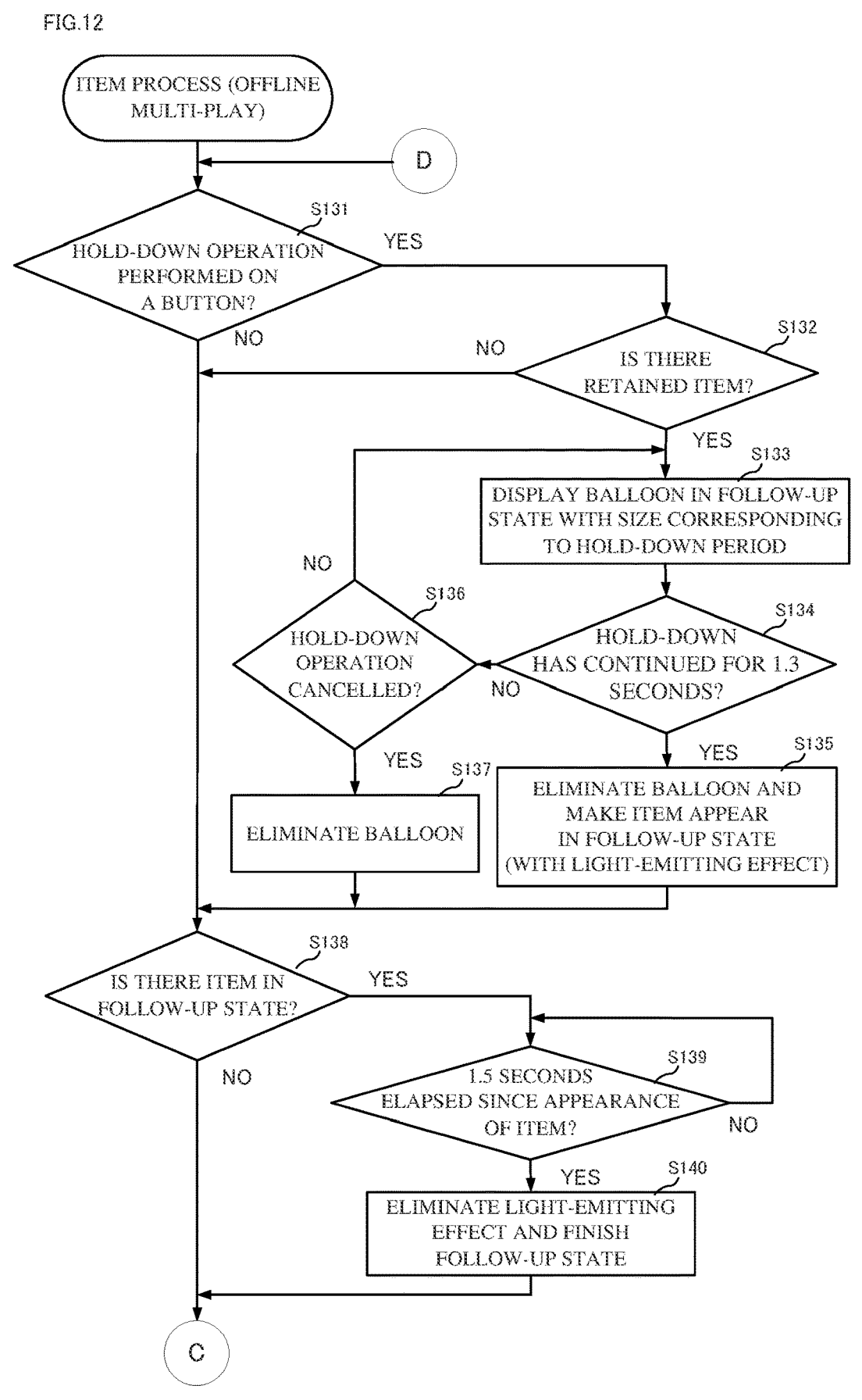

ITEM PROCESS (OFFLINE
MULTI-PLAY)

D

S131
HOLD-DOWN OPERATION
PERFORMED ON
A BUTTON?

YES

NO

S132
IS THERE
RETAINED ITEM?

NO

YES

S133
DISPLAY BALLOON IN FOLLOW-UP
STATE WITH SIZE CORRESPONDING
TO HOLD-DOWN PERIOD

S136
HOLD-DOWN
OPERATION
CANCELLED?

NO

S134
HOLD-DOWN
HAS CONTINUED FOR 1.3
SECONDS?

NO

YES

S137
ELIMINATE BALLOON

YES

S135
ELIMINATE BALLOON AND
MAKE ITEM APPEAR
IN FOLLOW-UP STATE
(WITH LIGHT-EMITTING EFFECT)

S138
IS THERE ITEM IN
FOLLOW-UP STATE?

YES

NO

S139
1.5 SECONDS
ELAPSED SINCE APPEARANCE
OF ITEM?

NO

YES

S140
ELIMINATE LIGHT-EMITTING
EFFECT AND FINISH
FOLLOW-UP STATE

C

COMPUTER-READABLE NON-TRANSITORY STORAGE MEDIUM HAVING GAME PROGRAM STORED THEREIN, GAME PROCESSING SYSTEM, GAME PROCESSING APPARATUS, AND GAME PROCESSING METHOD

CROSS REFERENCE TO RELATED APPLICATION

This application claims priority to Japanese Patent Application No. 2023-99235 filed on Jun. 16, 2023, the entire contents of which are incorporated herein by reference.

FIELD

The present disclosure relates to information processing for a game or the like.

BACKGROUND AND SUMMARY

Conventionally, there has been a game in which, in a case where an item made to appear by a player is acquired by another player, an item can be made to appear again.

It has been required that acquisition of an item and passing/receiving of an item to/from another player can be performed through a simple operation in such a game.

Accordingly, an object of the exemplary embodiments is to provide a computer-readable non-transitory storage medium having a game program stored therein, a game processing system, a game processing apparatus, and a game processing method that can achieve both of letting a player acquire an item for him/herself without another player acquiring the item, and letting a player pass an item to another player without the player acquiring the item for him/herself, through a simple operation.

Configuration examples for achieving the above objects will be shown below.

A first configuration example is a non-transitory computer-readable storage medium having stored therein instructions that, when executed by a processor of an information processing apparatus for executing a multi-play game online or offline, cause the information processing apparatus to: control a first player character in a virtual space on the basis of an operation input by a first player; cause a first item to appear in the virtual space on the basis of an operation input by the first player; cause the player character to acquire the first item on the basis of contact between the first player character and the first item; and after a predetermined period has elapsed since the appearance of the first item, on the basis of contact between the first item and another player character operated by another player, cause the other player character to acquire the first item.

According to the above first configuration example, only a player him/herself can acquire an item until a predetermined period elapses after the item is caused to appear, and meanwhile, it is also possible to give (pass) the item to another player by refraining from acquiring the item during the predetermined period.

In a second configuration example based on the first configuration example, the instructions cause the information processing apparatus to cause the first item that has appeared to perform follow-up movement in accordance with movement of the first player character, and stop the follow-up movement after the predetermined period has elapsed.

According to the above second configuration example, when the player character moves, the item performs follow-up movement accordingly, thus making it easy for a player character to acquire the item.

In a third configuration example based on the second configuration example, the instructions cause the information processing apparatus to cause the first item to appear above the first player character, and cause the first item to perform follow-up movement in a horizontal direction in accordance with horizontal movement of the first player character.

According to the above third configuration example, a player character can acquire an item through upward movement by a jump or the like, and meanwhile, also in a case of giving (passing) the item to another player, horizontal movement of the player character is not hampered.

In a fourth configuration example based on the first configuration example, the instructions cause the information processing apparatus to, on the basis of an operation input, cause the first item to appear when an operation of continuing to press a predetermined key of an operation device for a predetermined period is performed.

According to the above fourth configuration example, it is possible to prevent such an accident that a player erroneously presses a predetermined key so that an item is inadvertently made to appear.

In a fifth configuration example based on the first configuration example, the instructions cause the information processing apparatus to: when the first player character acquires an item in the game, retain the item as a retained item if a predetermined condition is satisfied; and in a case where the retained item is retained, cause the retained item to appear as the first item on the basis of an operation input.

In a sixth configuration example based on the first configuration example, the instructions cause the information processing apparatus to: execute the multi-play game offline; cause a second item to appear in the virtual space on the basis of an operation input by the other player; and after a predetermined period has elapsed since appearance of the second item, on the basis of contact between the first player character and the second item, cause the first player character to acquire the second item.

According to the above sixth configuration example, an item can be passed and received between players in offline multi-play.

In a seventh configuration example based on the first configuration example, the instructions cause the information processing apparatus to: execute the multi-play game online; not transmit information on the first item to another information processing apparatus operated by the other player, until the predetermined period elapses from the appearance of the first item; and after the predetermined period has elapsed since the appearance of the first item, if the first item has not been acquired, transmit information indicating a position of the first item to the other information processing apparatus.

According to the above seventh configuration example, in online multi-play, only information on an item that can be acquired is transmitted to another information processing apparatus, whereby it is possible to acquire the item without considering whether or not the item can be acquired on the other information processing apparatus.

In an eighth configuration example based on the seventh configuration example, the instructions cause the information processing apparatus to: when the information about the position of the second item is received from the other information processing apparatus, place the second item at the position in the virtual space; and cause the first player character to acquire the second item on the basis of contact between the first player character and the second item.

According to the above eighth configuration example, in online multi-play, an item can be passed and received between players.

According to the exemplary embodiments, it is possible to provide a computer-readable non-transitory storage medium having a game program stored therein, a game processing system, a game processing apparatus, and a game processing method that can achieve both of letting a player acquire an item for him/herself without another player acquiring the item, and letting a player pass an item to another player without the player acquiring the item for him/herself, through a simple operation.

BRIEF DESCRIPTION OF THE DRAWINGS

FIG. 6 illustrates a non-limiting example of a screen in offline multi-play;

FIG. 12 shows a non-limiting example of a flowchart of game processing; and

DETAILED DESCRIPTION OF NON-LIMITING EXAMPLE EMBODIMENTS

Hereinafter, an exemplary embodiment will be described.

Hardware Configuration of Information Processing System

Hereinafter, an information processing system (game system/game apparatus) according to an example of the exemplary embodiment will be described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies. Hereinafter, first, the hardware configuration of the game system 1 according to the exemplary embodiment will be described, and then, the control of the game system 1 according to the exemplary embodiment will be described.

Figure 1:
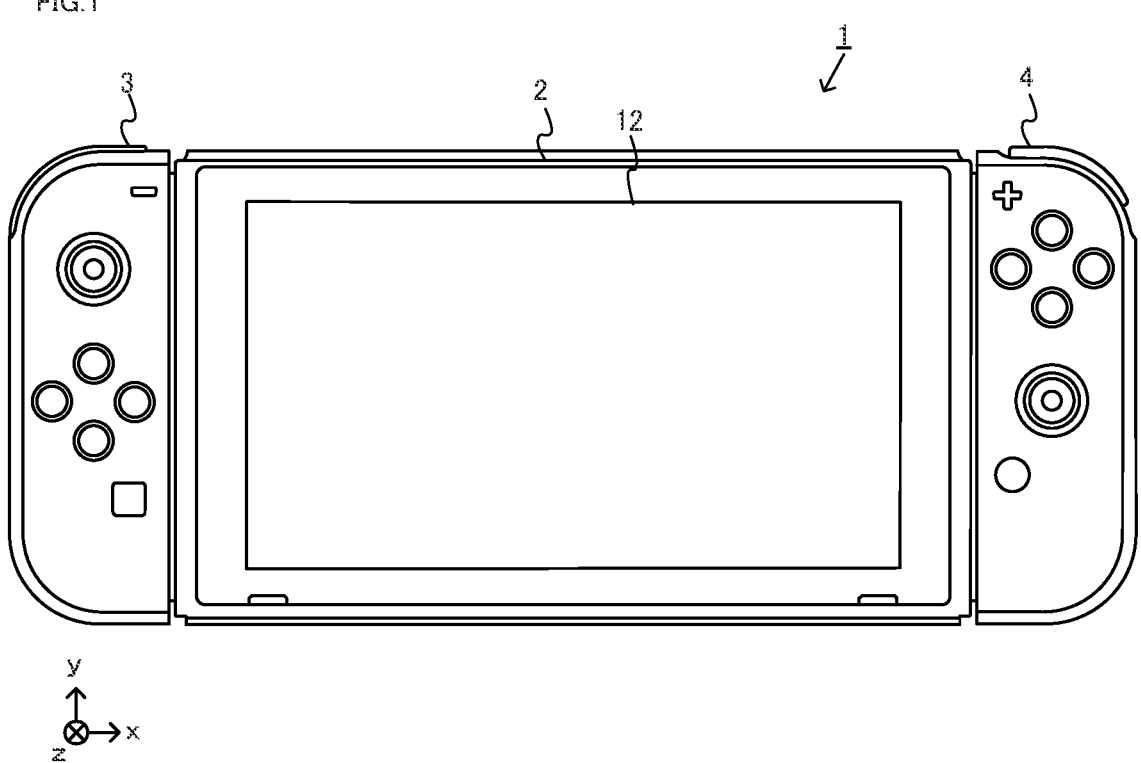
FIG. 1 shows a non-limiting example of a state in which a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes in the game system 1. The main body apparatus 2 includes a display 12. Each of the left controller 3 and the right controller 4 is an apparatus including operation sections with which a user provides inputs.

The main body apparatus 2 also includes speakers 88, and sounds such as sound effects are outputted from the speakers 88.

The main body apparatus 2 also includes a left terminal 17 for the main body apparatus 2 to perform wired communication with the left controller 3, and a right terminal 21 for the main body apparatus 2 to perform wired communication with the right controller 4.

The main body apparatus 2 also includes a slot 23. The slot 23 is provided on an upper side surface of a housing of the main body apparatus 2. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2.

Each of the left controller 3 and the right controller 4 includes various operation buttons, etc. The various operation buttons, etc., are used to give instructions according to various programs (e.g., an OS program and an application program) executed by the main body apparatus 2.

Each of the left controller 3 and the right controller 4 also includes a terminal 42 or 64 for performing wired communication with the main body apparatus 2.

Figure 2:
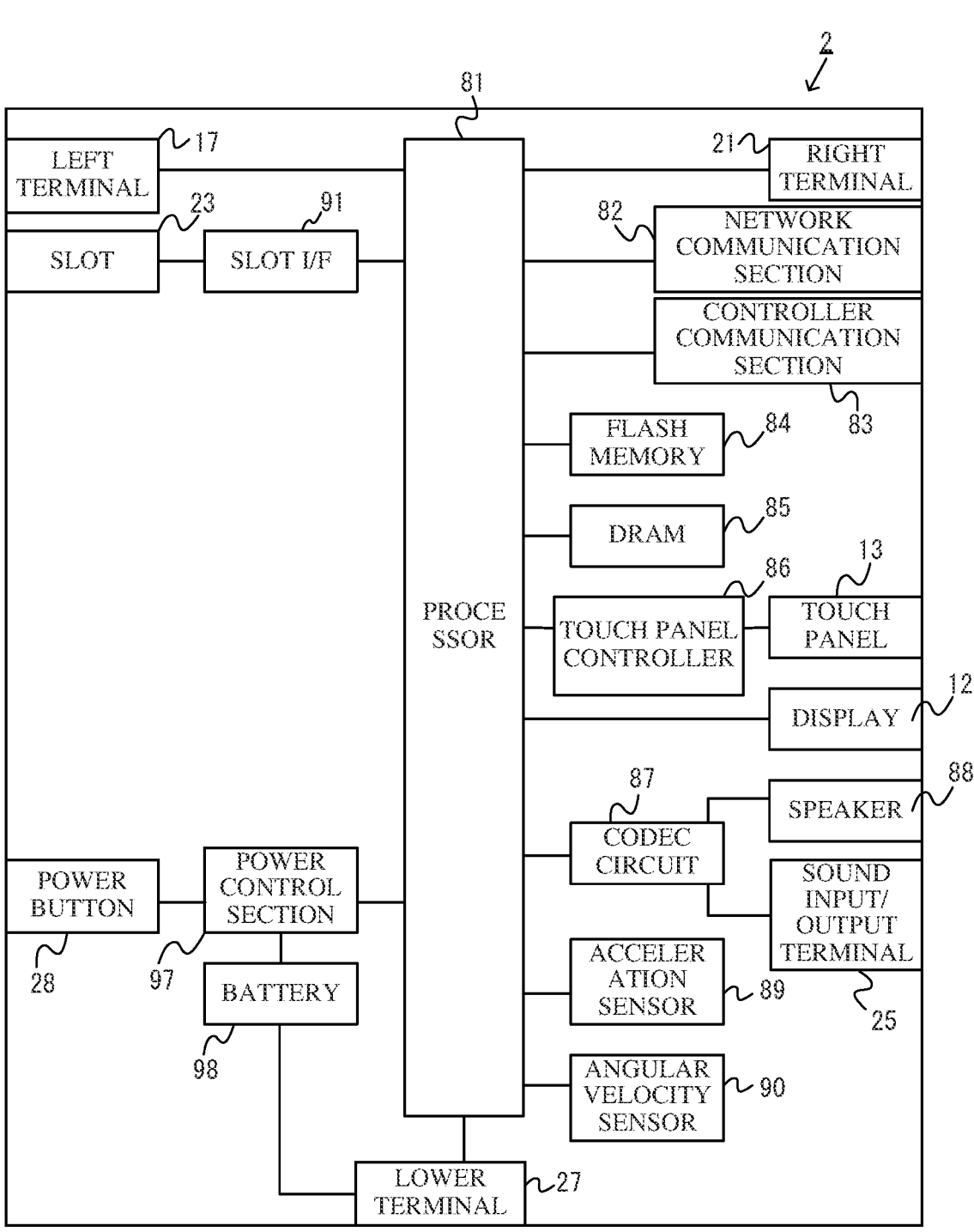
FIG. 2 is a block diagram showing a non-limiting example of the internal configuration of the main body apparatus 2.

FIG. 2 is a block diagram showing an example of the internal configuration of the main body apparatus 2. The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, the network communication section 82 connects to a wireless LAN by a method compliant with the Wi-Fi standard, for example, and performs Internet communication or the like with an external apparatus (another main body apparatus 2). Further, the network communication section 82 can also perform short-range wireless communication (e.g., infrared light communication) with another main body apparatus 2.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2, and the left controller 3 and the right controller 4, is discretionary. In the exemplary embodiment, the controller communication section 83 performs communication compliant with the Bluetooth (registered trademark) standard with the left controller 3 and with the right controller 4.

The processor 81 is connected to the above left terminal 17, the above right terminal 21, and a lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with a cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2, or the main body apparatus 2 alone, is attached to the cradle, the main body apparatus 2 can output data (e.g., image data or sound data) to the stationary monitor or the like via the cradle.

The main body apparatus 2 includes a touch panel controller 86, which is a circuit for controlling a touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and the speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 3:
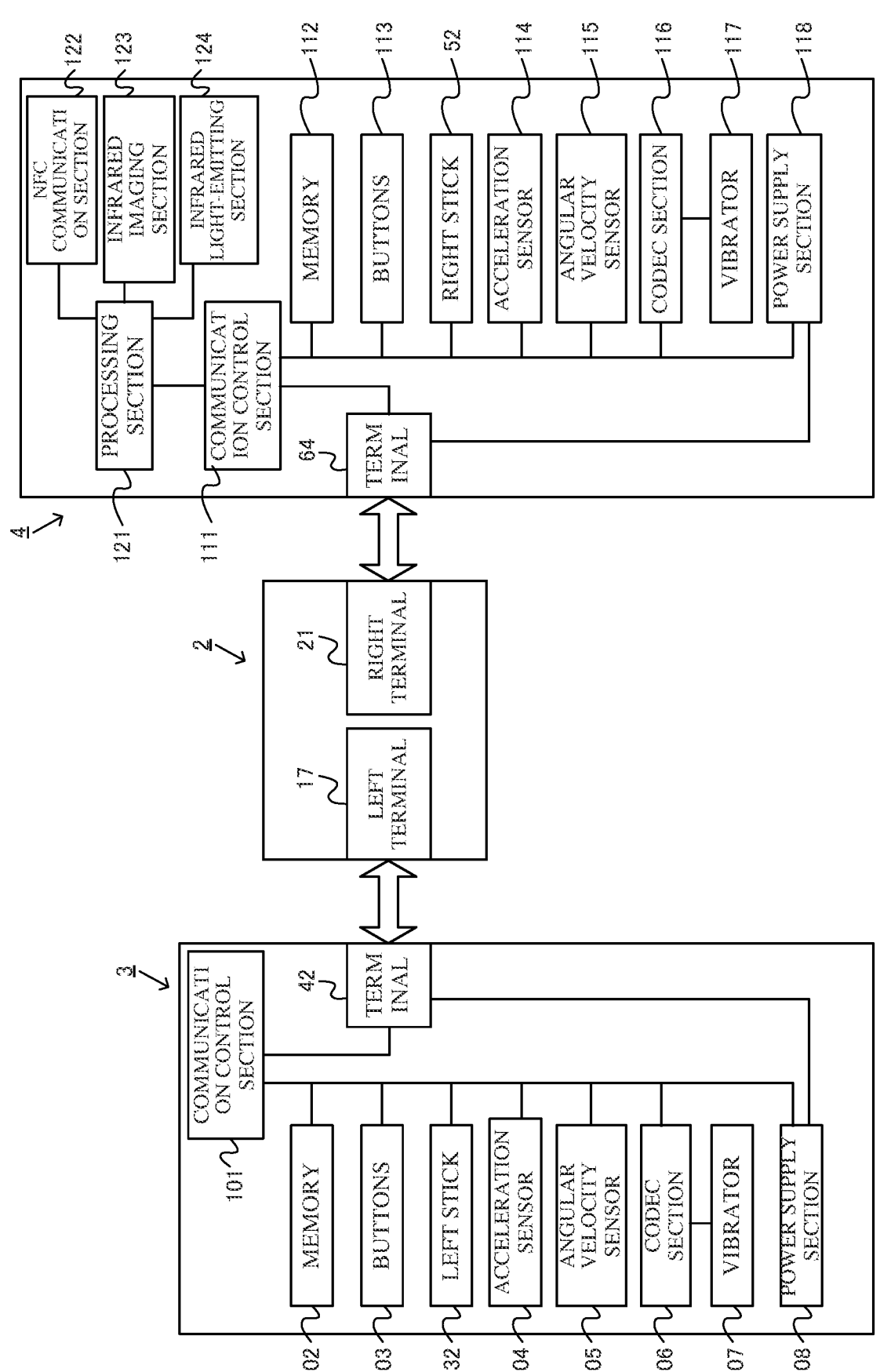
FIG. 3 is a block diagram showing a non-limiting example of the internal configurations of the main body apparatus 2, the left controller 3, and the right controller 4.

FIG. 3 is a block diagram showing examples of the internal configurations of the main body apparatus 2, the left controller 3, and the right controller 4. It should be noted that the details of the internal configuration of the main body apparatus 2 are shown in FIG. 2 and therefore are omitted in FIG. 3.

The left controller 3 includes a communication control section 101, which communicates with the main body apparatus 2. As shown in FIG. 3, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

The left controller 3 also includes a memory 102 such as a flash memory. The communication control section 101 includes, for example, a microcomputer (or a microprocessor) and executes firmware stored in the memory 102, thereby performing various processes.

The left controller 3 includes buttons 103. The left controller 3 also includes a left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 1) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 1). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation, or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown, the power control circuit is connected to the battery and also connected to components of the left controller 3 (specifically, components that receive power supplied from the battery).

As shown in FIG. 3, the right controller 4 includes a communication control section 111, which communicates with the main body apparatus 2. The right controller 4 also includes a memory 112 which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, a right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

Game Assumed in Exemplary Embodiment

Next, the outline of game processing (example of information processing) executed in the game system 1 according to the exemplary embodiment will be described. The game assumed in the exemplary embodiment is an action game in which, in a virtual space (game space) where various objects are placed, a player object (which may be referred to as "player character") which acts in accordance with an operation by a player (user) moves to achieve a predetermined purpose of, e.g., reaching a goal point. The game is not limited to an action game and may be another kind of game (role-playing game or sport game such as soccer game).

Outline of Game Processing in Exemplary Embodiment

In this game processing, a game can be executed in online multi-play in which a plurality of game apparatuses (game systems) 1 and a server are connected communicably with each other via the Internet and a plurality of players (e.g., four players at maximum) play the game simultaneously using their respective game apparatuses 1. In addition, in this game processing, a plurality of controllers (3, 4) whose number is not greater than a predetermined number (e.g., four) can be connected to one game apparatus 1 (one main body apparatus 2), and a game can be executed in offline multi-play in which a plurality of players (e.g., four at maximum) play the game simultaneously using one game apparatus 1 (one main body apparatus 2).

In this game processing, an action of a player character placed in a virtual space, and the like, are controlled in accordance with an operation by a player, and an image of the virtual space is taken (drawn) by a virtual camera and displayed on a screen (display 12), while the game progresses. This game is a game played while a two-dimensional game image obtained by taking an image of a virtual space directly sideways is displayed on the screen (see FIG. 4, etc.). However, a game played while a three-dimensional game image obtained by taking an image of a virtual space from an obliquely upper side or the like is displayed on the screen, may be adopted.

Figure 4:
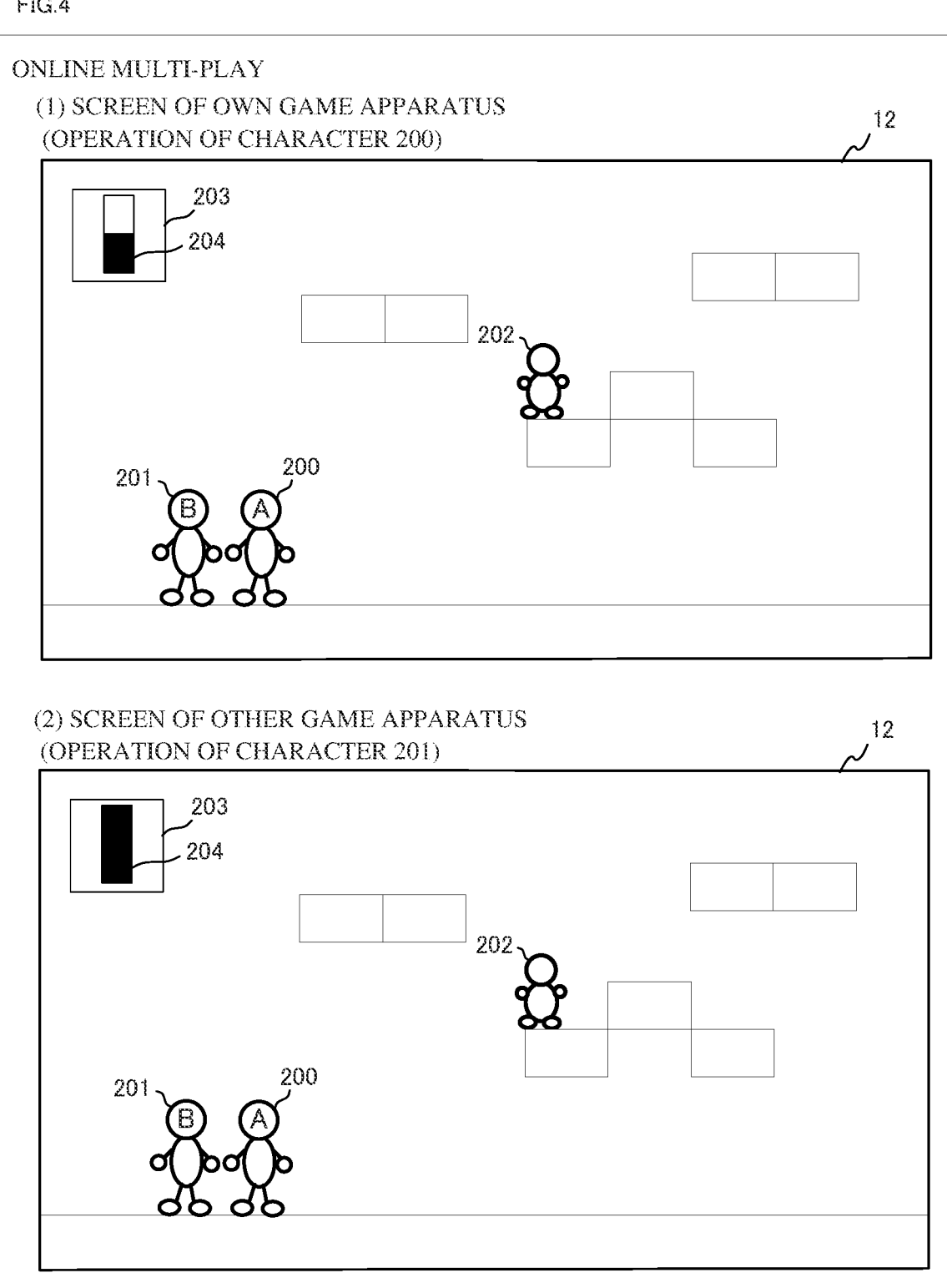
FIG. 4 illustrates a non-limiting example of a screen in online multi-play.
Figure 5:
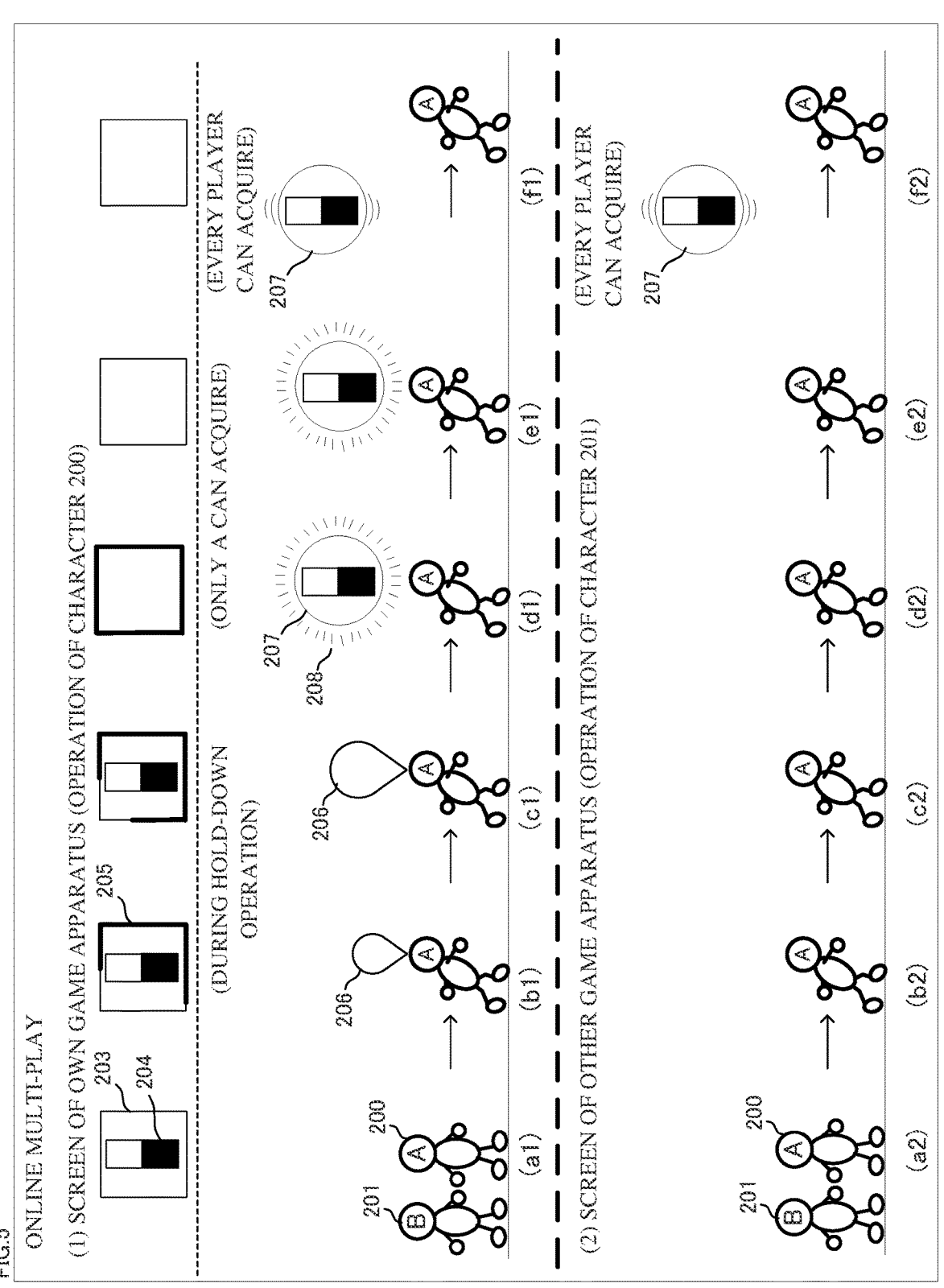
FIG. 5 illustrates a non-limiting example of appearance of an item and the like in online multi-play.

FIG. 4 illustrates a screen of the game apparatus operated by the player him/herself (which may be referred to as "own game apparatus") and a screen of the game apparatus operated by another person (another player) (which may be referred to as "other game apparatus"), in a case of executing the game in the online multi-play. FIG. 5 illustrates a situation in which an item is made to appear and the item is acquired by the player him/herself (own player character) or passed to another player (other player character), in a case of executing the game in online multi-play. Hereinafter, as an example, a case where two players play the game in online multi-play will be described.

FIG. 4(1) shows an example of a screen of the own game apparatus operated by a player whose player character is a player character 200 (a character having a face denoted by A). FIG. 4(2) shows an example of a screen of another game apparatus operated by another player whose player character is a player character 201 (a character having a face denoted by B). A character 202 is an enemy character, and if a player character comes into contact with the enemy character, this is treated as a mistake and the player character takes damage. As shown in FIG. 4(1) and FIG. 4(2), a virtual space in the own game apparatus and a virtual space in the other game apparatus correspond to each other in placed objects (player characters, enemy characters, items, blocks, the ground, etc.), and the positional relationship therebetween is assumed to be the same. However, the position relationship of objects may not necessarily be the same. For example, the positions and the like of characters may differ from each other due to communication delay or the like, and under such a condition, the game can progress as long as at least placed items coincide with each other.

As shown in FIG. 4(1), a retained item box 203 for indicating a retained item retained by the own player character and a retained item 204 retained by the own player character 200 are displayed at the upper left on the screen of the own game apparatus. As shown in FIG. 4(2), a retained item box 203 for indicating a retained item retained by the other player character 201 and a retained item 204 retained by the other player character 201 are displayed at the upper left on the screen of the other game apparatus.

One retained item box 203 is displayed and the retained item of the own player character is displayed in the retained item box 203. In this game, as an example, items for which various strength levels are set appear in the virtual space (or are placed in advance). Then, by contacting with the item to acquire the same, the player character can attain a power-up corresponding to the strength level of the acquired item. For example, the player character transforms into an outer appearance (form) corresponding to the kind of the item and can obtain the corresponding ability. The strength level of the retained item 204 displayed in the retained item box 203 in FIG. 4(1) is "middle", and if the player character has acquired the item, the player character gains a strength level of "middle". The strength level of the retained item 204 displayed in the retained item box 203 in FIG. 4(2) is "high", and if the player character has acquired the item, the player character gains a strength level of "high".

When the player character is to acquire an item placed in the virtual space, if the strength level set for the item to be acquired is equal to or smaller than the present strength level of the player character, the item is stocked as a retained item without being acquired. For example, if the player character 200 having a strength level of "high" is to acquire the item for a strength level of "middle", the item is stocked as a retained item without being acquired. In a case where the player character has already acquired an item and thus has a raised strength level, if the player character acquires an item which is placed in the virtual space and for which a higher strength level is set, the strength level of the player character is changed to the strength level corresponding to the acquired item and the previously acquired item is stocked as a retained item. For example, if the player character 200 having a strength level of "middle" is to acquire an item for a strength level of "high", the strength level of the player character 200 becomes "high" and the item for the strength level of "middle" is stocked as a retained item. In the above situations, in a case where an item has been already retained (acquired), the one for a higher strength level, of the already retained item and an item to be newly retained, may be stocked as a retained item.

If the player character makes a mistake and takes damage, the strength level thereof is lowered.

Next, with reference to FIG. 5, a situation in which a retained item is made to appear in a virtual space and the item is acquired by the own player character or passed to another player character, in online multi-play, will be described. In FIG. 5, the upper side of a broken line (see FIG. 5(1)) is the displayed content of the screen (screen where the player character 200 is operated) on the own game apparatus shown in FIG. 4(1), and the lower side of the broken line (see FIG. 5(2)) is the displayed content of the screen (screen where the player character 201 is operated) on the other game apparatus shown in FIG. 4(2). In FIG. 5, the player character 201 does not move and the player character 200 starts to run and moves rightward.

First, as shown at (a1) and (a2) in FIG. 5, the player character 200 and the player character 201 stay still on the screen of the own game apparatus and the screen of the other game apparatus. In addition, as shown on the upper side of (a1) in FIG. 5, the retained item 204 of the player character 200 is displayed in the retained item box 203 of the own game apparatus (the game apparatus on which the player character 200 is operated).

Next, as shown at (b1) and (c1) in FIG. 5, when the player for the player character 200 performs a hold-down operation on an A button (A key) included among the buttons (see FIG. 3), as shown on the upper side of (b1) and (c1) in FIG. 5, on the screen of the own game apparatus, a hold-down gauge 205 is displayed on the retained item box 203 displayed on the screen of the own game apparatus, with the length of the hold-down gauge 205 corresponding to the duration of the hold-down operation, and a balloon 206 is displayed above the head (upward) of the player character 200 with the size of the balloon 206 corresponding to the duration of the hold-down operation. Meanwhile, as shown at (b2) and (c2) in FIG. 5, the balloon 206 is not displayed on the screen of the other game apparatus.

Next, as shown at (d1) in FIG. 5, when the hold-down operation has continued for a predetermined period (e.g., 1.3 seconds), on the screen of the own game apparatus, the hold-down gauge 205 reaches the maximum length, so that the retained item 204 in the retained item box 203 is eliminated and appears as an item 207 above the head (upward) of the player character 200. Such a hold-down operation can prevent the item 207 from being made to appear by an erroneous operation. However, in another exemplary embodiment, the item 207 may be made to appear without performing a hold-down operation. Then, as shown at (d1) and (e1) in FIG. 5, the item 207 that has appeared is provided with a light-emitting effect 208 and moves leftward/rightward (horizontal direction) while following the player character 200 that has made the item appear, until a predetermined period (e.g., 1.5 seconds) elapses. Only the player character 200 that has made the item 207 appear can acquire the item 207 that has appeared (contact with the item 207 to acquire the same) by jumping in accordance with a player's operation. Meanwhile, as shown at (d2) and (e2) in FIG. 5, on the screen of the other game apparatus, the item 207 provided with the light-emitting effect 208 is not displayed (does not appear). In online multi-play, since the item 207 is not displayed on the screen of the other game apparatus during the above period (see (d2) and (e2) in FIG. 5), in another exemplary embodiment, the above follow-up movement and light emission may not be performed on the screen of the own game apparatus. However, if representation is made the same as that in offline multi-play described later, it is possible to apply the same embodiment even in offline-online-combined multi-play in which, for example, players are connected online in two-player play.

Next, as shown at (f1) in FIG. 5, on the screen of the own game apparatus, when a predetermined period (e.g., 1.5 seconds) has elapsed since the light-emitting effect 208 was provided, the item 207 finishes follow-up movement to the player character 200 and comes into a state of floating while slightly moving up and down at the finish position, and the light-emitting effect 208 is eliminated. Meanwhile, as shown at (f2) in FIG. 5, on the screen (virtual space) of the other game apparatus, the item 207 appears at a position corresponding to (f1) in FIG. 5. Every player character can acquire the item 207 in a floating state, by contacting with the item 207. When acquired, the item 207 is eliminated (from the virtual spaces in the own game apparatus and the other game apparatus).

Figure 6:
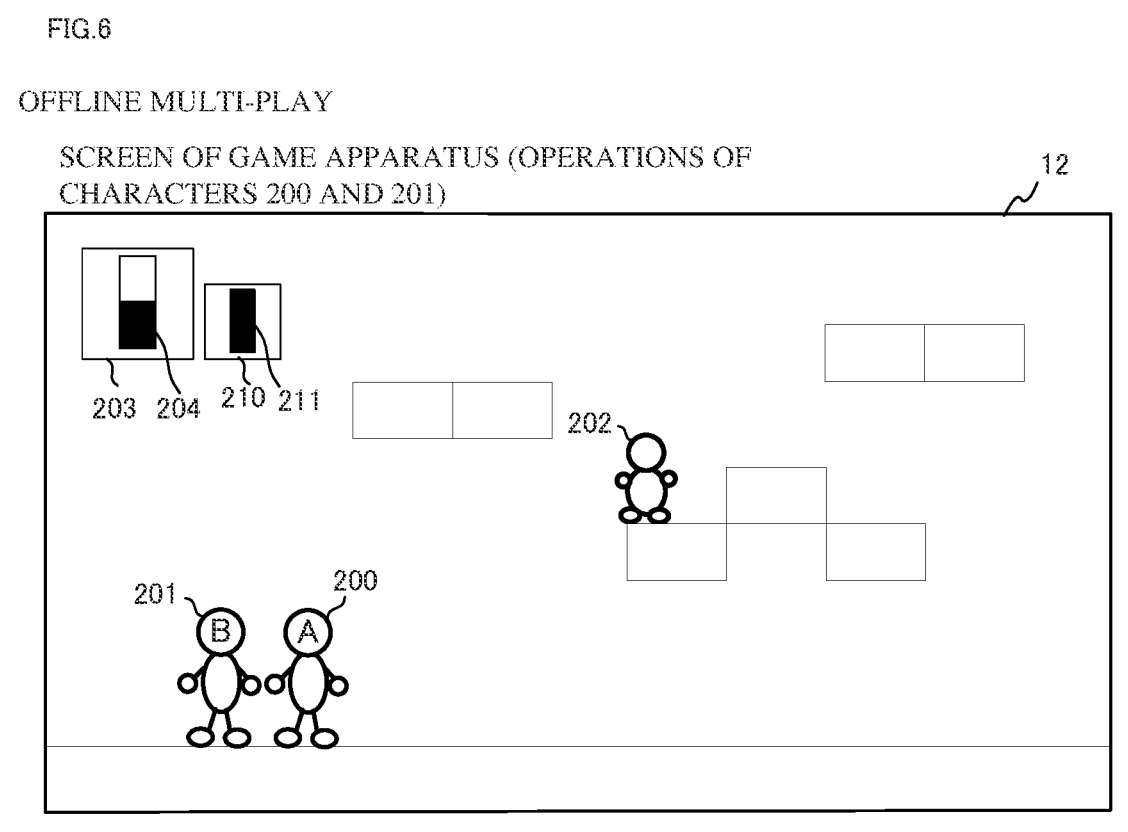
Figure 7:
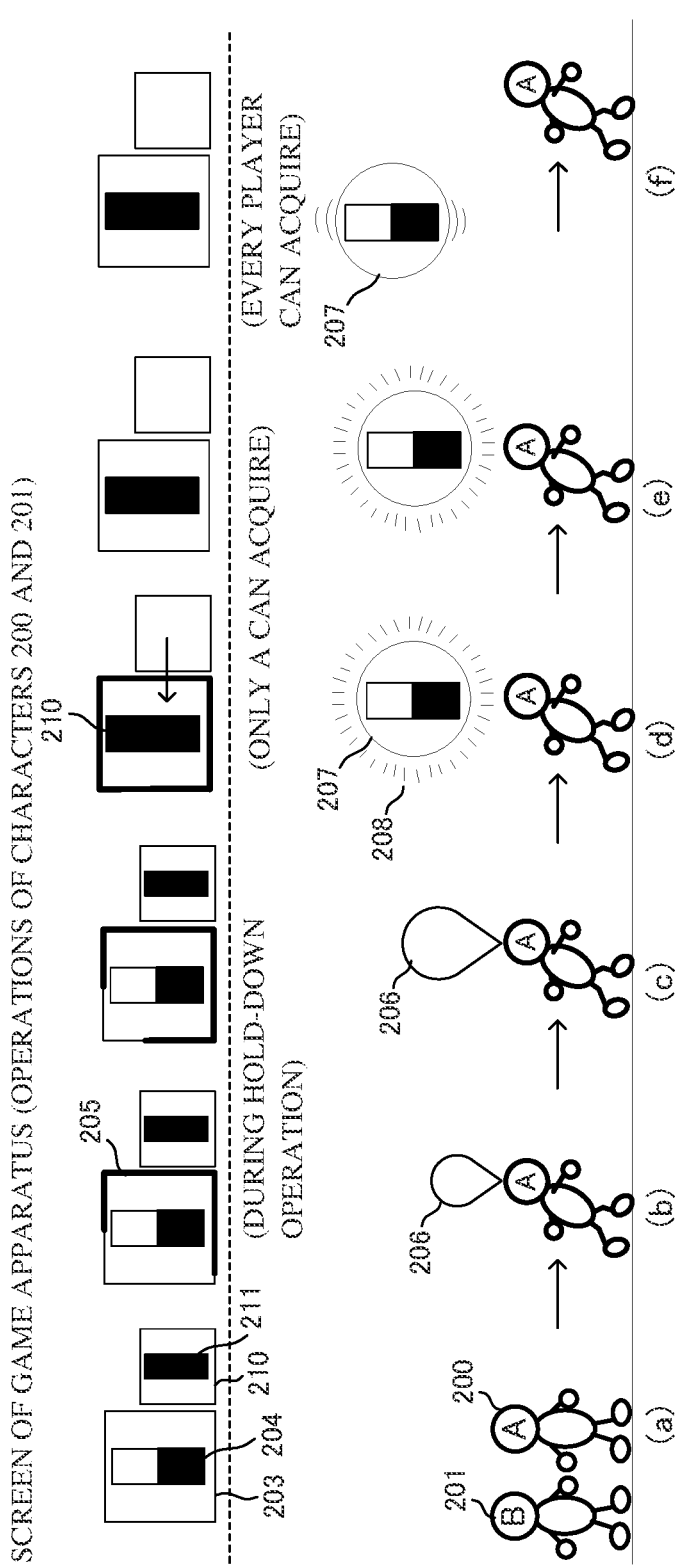
FIG. 7 illustrates a non-limiting example of appearance of an item and the like in offline multi-play.

FIG. 6 illustrates a screen (shared screen) of the game apparatus on which a plurality of players perform operations in a case of executing a game in offline multi-play. FIG. 7 illustrates a situation in which an item is made to appear, and the item is acquired by a player character that has made the item appear, or is passed to another player character, in a case of executing the game in offline multi-play. Hereinafter, as an example, offline multi-play in which two players play the game will be described. In the following description, explanation of the same matters as in the case of online multi-play described with reference to FIG. 4 and FIG. 5 may be omitted.

FIG. 6 shows an example of a screen of the game apparatus (one game apparatus) on which a player whose player character is a player character 200 and another player whose player character is a player character 201 perform operations.

As shown in FIG. 6, at the upper left on the screen of the game apparatus, retained item boxes 203 and 210 for indicating retained items shared by the player character 200 and the player character 201, are displayed. That is, in offline multi-play, an item stocked as a retained item by one player character can be made to appear in the virtual space by another player character. In addition, in offline multi-play, retained item boxes whose number is the same as the number of the player characters are displayed so as to be arranged in the left-right direction, and items whose number is the same as the number of the retained item boxes can be retained. In FIG. 6, since there are two player characters, the retained item boxes 203 and 210 are displayed and the retained items 204 and 211 are displayed. Then, the retained items are displayed such that the one retained at the older timing is located in the retained item box close to the left end. Only the retained item box at the left end is displayed in a large size, an item appears in the virtual space in an order from the retained item in the retained item box at the left end, and then, the other retained items are each shifted to move to the retained item box on the left side.

Next, with reference to FIG. 7, in offline multi-play, a situation in which a retained item is made to appear in the virtual space and the item is acquired by the own player character or passed to another player character will be described. In FIG. 7, as in FIG. 5, the player character 201 does not move and the player character 200 starts to run and moves in the right direction.

First, as shown at (a) in FIG. 7, the player character 200 and the player character 201 stay still. In addition, as shown on the upper side of (a) in FIG. 7, the shared retained items 204 and 211 are displayed in the retained item boxes 203 and 210.

Next, as shown at (b) and (c) in FIG. 7, when the player for the player character 200 performs a hold-down operation on the A button, as shown on the upper side of (b) and (c) in FIG. 7, a hold-down gauge 205 is displayed in the retained item box 203 with the length of the hold-down gauge 205 corresponding to the duration of the hold-down operation, and a balloon 206 is displayed above the player character 200 with the size of the balloon 206 corresponding to the duration of the hold-down operation.

Next, as shown at (d) in FIG. 7, when the hold-down operation has continued for a predetermined period (e.g., 1.3 seconds), the hold-down gauge 205 reaches the maximum length, so that the retained item 204 in the retained item box 203 is eliminated, the retained item 211 shifts to the retained item box 203, and the retained item 204 appears as an item 207 above the head (upward) of the player character 200. Then, as shown at (d) and (e) in FIG. 7, the item 207 that has appeared is provided with a light-emitting effect 208 and moves leftward/rightward (horizontal direction) while following the player character 200 that has made the item appear, until a predetermined period (e.g., 1.5 seconds) elapses. Only the character 200 that has made the item 207 appear can acquire the item 207 that has appeared (contact with the item 207 to acquire the same) by jumping in accordance with a player's operation.

Next, as shown at (f) in FIG. 7, when a predetermined period (e.g., 1.5 seconds) has elapsed since the light-emitting effect 208 was provided, the item 207 finishes follow-up movement to the player character 200 and comes into a state of floating while slightly moving up and down at the finish position, and the light-emitting effect 208 is eliminated. Every player character can acquire the item 207 in a floating state, by contacting with the item 207. When acquired, the item 207 is eliminated (from the virtual space in the game apparatus).

Details of Information Processing in Exemplary Embodiment

Next, with reference to FIG. 8 to FIG. 13, the information processing in the exemplary embodiment will be described in detail.

Used Data

Figure 8:
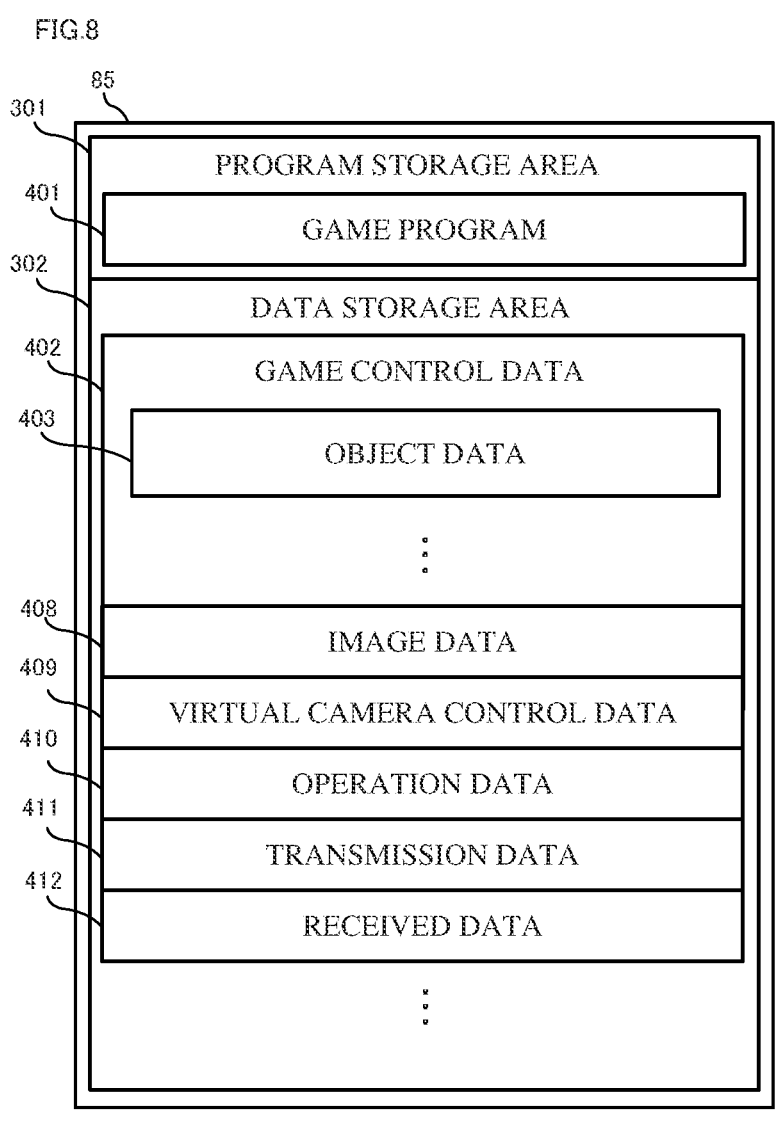
FIG. 8 shows a non-limiting example of various data stored in a DRAM 85.

Various data used in this game processing will be described. FIG. 8 shows an example of data stored in the DRAM 85 of the game system 1. As shown in FIG. 8, the DRAM 85 has at least a program storage area 301 and a data storage area 302. A game program 401 is stored in the program storage area 301. In the data storage area 302, game control data 402, image data 408, virtual camera control data 409, operation data 410, transmission data 411, received data 412, and the like, are stored. The game control data 402 includes object data 403.

The game program 401 is a game program for executing this game processing.

The object data 403 is data of objects to be placed in a virtual space, and is data of objects such as player characters, enemy characters, items, grounds, blocks, rocks, stones, trees, and constructions. The object data 403 further includes data of the coordinates (positions), directions, postures, states, and the like of objects.

The image data 408 is image data of backgrounds, virtual effects, and the like.

The virtual camera control data 409 is data for controlling movement of a virtual camera placed in a virtual space.

Specifically, the virtual camera control data 409 is data for specifying the position, the orientation, the angle of view, the shooting direction, and the like of the virtual camera.

The operation data 410 is data indicating the contents of operations performed on the left controller 3 and the right controller 4. For example, the operation data 410 includes data indicating input states regarding movements and orientation changes of the left controller 3 and the right controller 4, press states of the buttons thereof, and the like. The contents of the operation data 410 are updated at a predetermined cycle on the basis of signals from the left controller 3 and the right controller 4.

The transmission data 411 is data to be transmitted to another game system 1, and includes at least information for identifying the transmission source and the contents of the operation data 410. The transmission data 411 includes data (data indicating coordinates (position), posture, state, etc.) about the own player character, and the like, to be transmitted to another game system 1 of another player in multi-play.

The received data 412 is data that is the transmission data received from another game system 1 and is stored in an identifiable manner for each of other game systems 1 (i.e., for each transmission source). The received data 412 includes data (data indicating coordinates (position), posture, state, etc.) about another player character and the like, received from another game system 1 of another player in multi-play (or from a server).

In addition to the above, various data to be used in the game processing are stored in the DRAM 85, as necessary.

Details of Game Processing

Next, with reference to flowcharts, the details of the game processing according to the exemplary embodiment will be described. FIG. 9 to FIG. 13 show examples of flowcharts showing the details of the game processing according to the exemplary embodiment.

Figure 9:
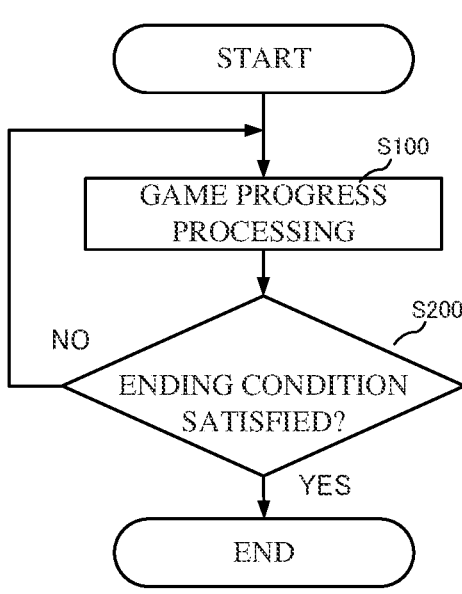
FIG. 9 shows a non-limiting example of a flowchart of game processing.

First, as shown in FIG. 9, when the game processing is started, in step S100, the processor 81 executes game progress processing using the game program 401 and the like. The game progress processing includes control of player characters, control of non-player characters such as enemy characters, an item process described later, and the like, and also includes sound processing and image processing of drawing a virtual space every frame. Then, in step S200, the processor 81 determines whether or not an ending condition for the game is satisfied. The ending condition for the game is, for example, that all player characters (or one player character) participating in the game have reached a goal point, or that damage of all the player characters participating in the game has reached an upper limit. If the determination result is NO in step S200, the process returns to step S100 to continue the game, and if the determination result is YES, the game processing is ended. Hereinafter, processing relevant to items will be mainly described with reference to flowcharts.

Figure 10:
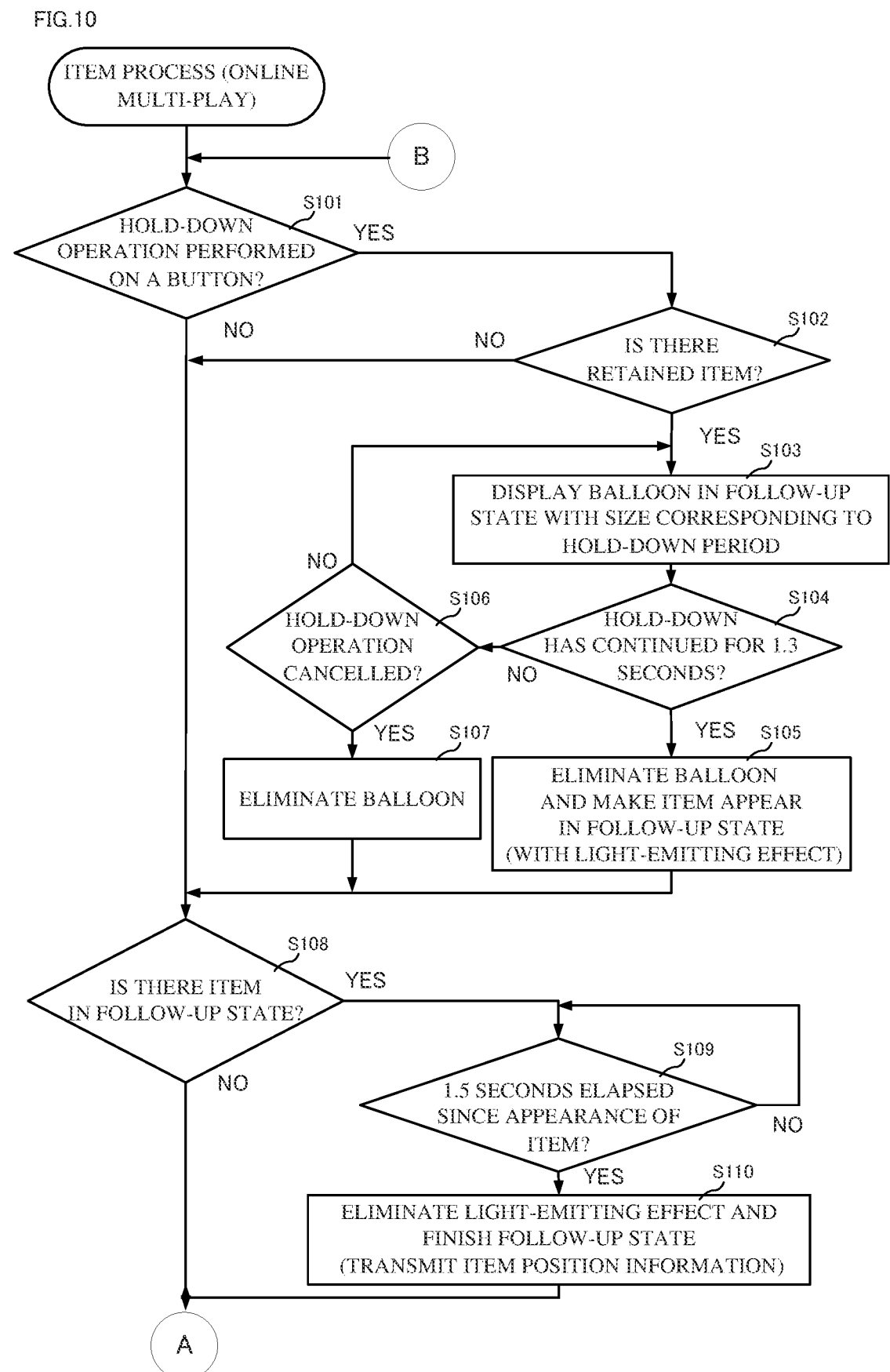
FIG. 10 shows a non-limiting example of a flowchart of game processing.
Figure 11:
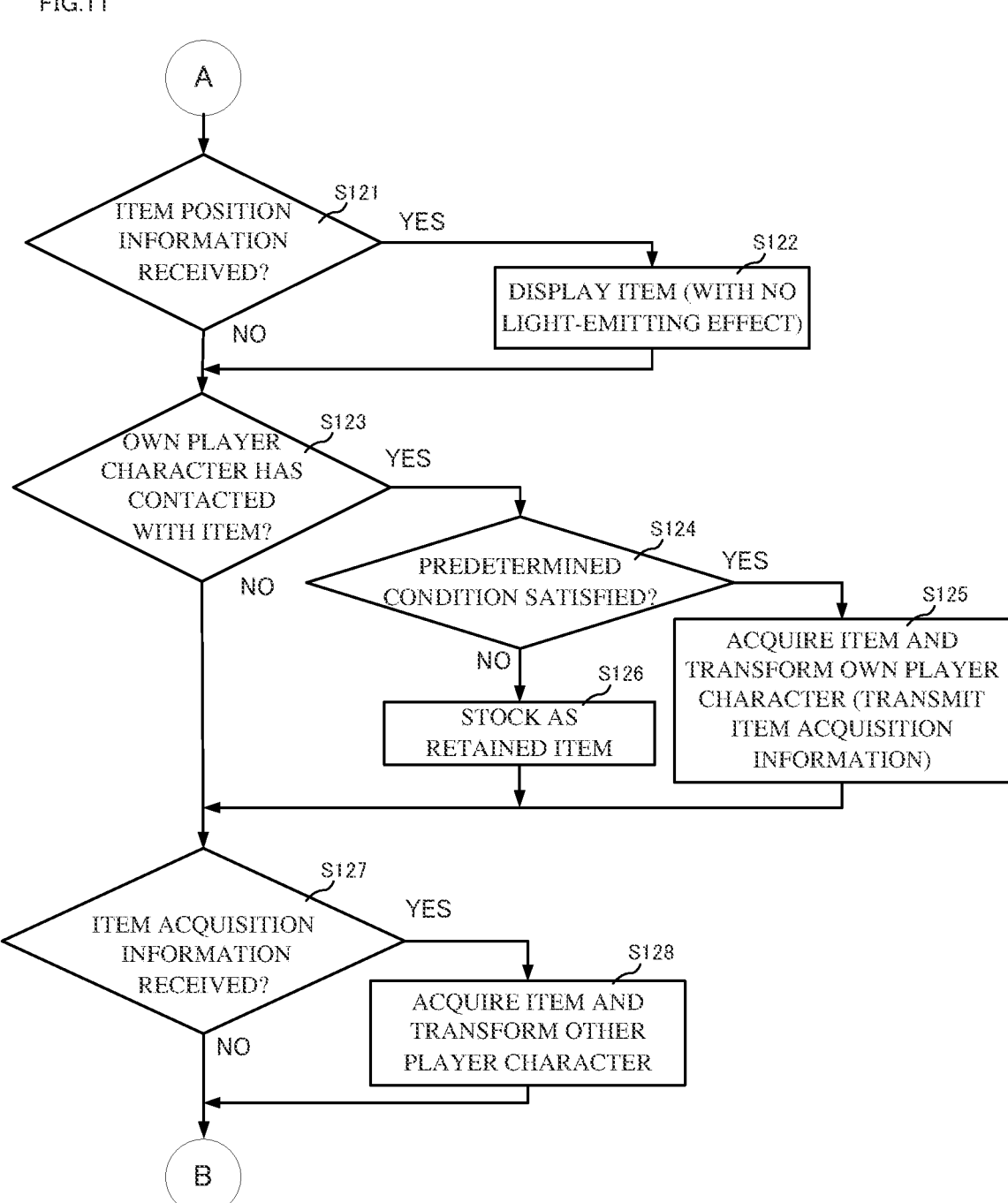
FIG. 11 shows a non-limiting example of a flowchart of game processing.

FIG. 10 and FIG. 11 show examples of flowcharts of the item process in a case where the game is executed in online multi-play in the game progress processing S100 in FIG. 9.

In step S101 in FIG. 10, the processor 81 determines whether or not a hold-down operation on the A button has been performed, on the basis of the operation data 410. Specifically, the processor 81 determines that a hold-down operation has been performed, when the continuous pressing time for the A button has reached a predetermined period (e.g., 0.3 seconds) or longer. If the determination result is YES in step S101, the process proceeds to step S102, and if the determination result is NO, the processing proceeds to step S108.

In step S102, the processor 81 determines whether or not there is a retained item. If the determination result is YES in step S102, the process proceeds to step S103, and if the determination result is NO, the process proceeds to step S108.

In step S103, on the basis of the operation data 410 and the like, the processor 81 displays a balloon above the head of the own player character with the size of the balloon corresponding to the duration of the hold-down operation determined in step S101, and moves the balloon so as to follow movement of the own player character (see (b1) and (c1) in FIG. 5). In addition, the processor 81 displays a hold-down gauge with its length corresponding to the duration of the hold-down operation (see (b1) and (c1) in FIG. 5). Then, the process proceeds to step S104.

In step S104, the processor 81 determines whether or not the hold-down operation determined in step S101 has continued for 1.3 seconds, on the basis of the operation data 410. If the determination result is YES in step S104, the process proceeds to step S105, and if the determination result is NO, the process proceeds to step S106.

In step S105, on the basis of the object data 403 and the like, the processor 81 eliminates the retained item determined to be present in step S102, makes the corresponding item appear at the position of the balloon, and eliminates the balloon (see (c1) and (d1) in FIG. 5). In addition, the processor 81 provides a light-emitting effect to the item made to appear, displays the item above the head of the own player character, and moves the item so as to follow left-right movement of the own player character (see (d1) and (e1) in FIG. 5). Further, the processor 81 eliminates the hold-down gauge at the same time as making the item appear. As described with reference to (d1) and (e1) in FIG. 5, only the own player character that has made the item appear can acquire the item provided with the light-emitting effect above the head by jumping. Then, the process proceeds to step S108.

In step S106, the processor 81 determines whether or not the hold-down operation determined in step S101 has been canceled, on the basis of the operation data 410. If the determination result is YES in step S106, the process proceeds to step S107, and if the determination result is NO, the process returns to step S103.

In step S107, the processor 81 eliminates the balloon displayed in step S103. Then, the process proceeds to step S108.

In step S108, the processor 81 determines whether or not there is an item following the own player character, on the basis of the object data 403 and the like. If the determination result is YES in step S108, the process proceeds to step S109, and if the determination result is NO, the process proceeds to step S121 in FIG. 11.

In step S109, the processor 81 determines whether or not 1.5 seconds has elapsed since appearance of the item (item present in the virtual space) determined to be present in step S108, on the basis of the object data 403 and the like. Then, if it is determined in step S109 that 1.5 seconds has elapsed (YES), the process proceeds to step S110.

In step S110, the processor 81 eliminates the light-emitting effect provided to the item determined to be present in step S108, finishes the follow-up movement of the item to the own player character, and floats the item at the finish position (see (e1) and (f1) in FIG. 5). In addition, the processor 81 transmits item position information to another game apparatus. The item position information includes information indicating the position, the kind (strength level), and the like of the floating item. Then, the process proceeds to step S121 in FIG. 11.

In step S121, the processor 81 determines whether or not item position information has been received from another game apparatus. If the determination result is YES in step S121, the process proceeds to step S122, and if the determination result is NO, the process proceeds to step S123.

In step S122, the processor 81 causes an item (a floating item provided with no light-emitting effect) of the kind indicated by the item position information to appear at the position indicated by the item position information (see (f2) in FIG. 5). Then, the process proceeds to step S123.

In step S123, the processor 81 determines whether or not the own player character has contacted with any item. If the determination result is YES in step S123, the process proceeds to step S124, and if the determination result is NO, the process proceeds to step S127.

In step S124, the processor 81 determines whether or not a predetermined condition has been satisfied. The predetermined condition is that a strength level to be imparted by the item (item to be acquired) determined to have contacted in step S123 is higher than the present strength level of the own player character. If the determination result is YES in step S124, the process proceeds to step S125, and if the determination result is NO, the process proceeds to step S126.

In step S125, the processor 81 performs processing in which the own player character acquires the item determined to have contacted in step S123 and the own player character gains a strength and transforms into an outer appearance (form) in accordance with the item. In addition, the processor 81 eliminates the item and transmits item acquisition information to another game apparatus. The item acquisition information includes information indicating the kind (strength level) of the acquired item, the player character that has acquired the item, and the like. Thereafter, the process proceeds to step S127.

In step S126, the processor 81 stocks the item determined to have contacted in step S123, as a retained item, and displays the item in the retained item box (see 204 in (1) of FIG. 4). Here, in a case where a retained item has already been stocked, the item determined to have contacted in step S123 is not stocked. Then, the process proceeds to step S127. In a case where the own player character acquires the item in step S125, if the own player character has already acquired an item (an item for a lower strength level than the item to be acquired) and thus the strength level of the own player character has already increased, the already acquired item is stocked as a retained item (unless a retained item has already been stocked).

In step S127, the processor 81 determines whether or not item acquisition information has been received from another game apparatus. If the determination result is YES in step S127, the process proceeds to step S128, and if the determination result is NO, the process returns to step S101 in FIG. 10.

In step S128, the processor 81 performs processing in which the other player character that has acquired the item gains a strength and transforms into an outer appearance (form) in accordance with the item, on the basis of the item acquisition information received in step S127. In addition, the processor 81 eliminates the acquired item. Then, the process returns to step S101 in FIG. 10.

In a case where the game is executed in online multi-play described with reference to FIG. 4 and FIG. 5, the item made to appear by the own player character (200 in (1) of FIG. 5)

may be referred to as a first item, and the item made to appear by another player character (201 in (1) of FIG. 5) may be referred to as a second item. In a case where the game is executed in offline multi-play described with reference to FIG. 6 and FIG. 7, the item made to appear by one player character (200 in FIG. 7) may be referred to as a first item, and the item made to appear by the other player character (201 in FIG. 7) may be referred to as a second item.

Figure 13:
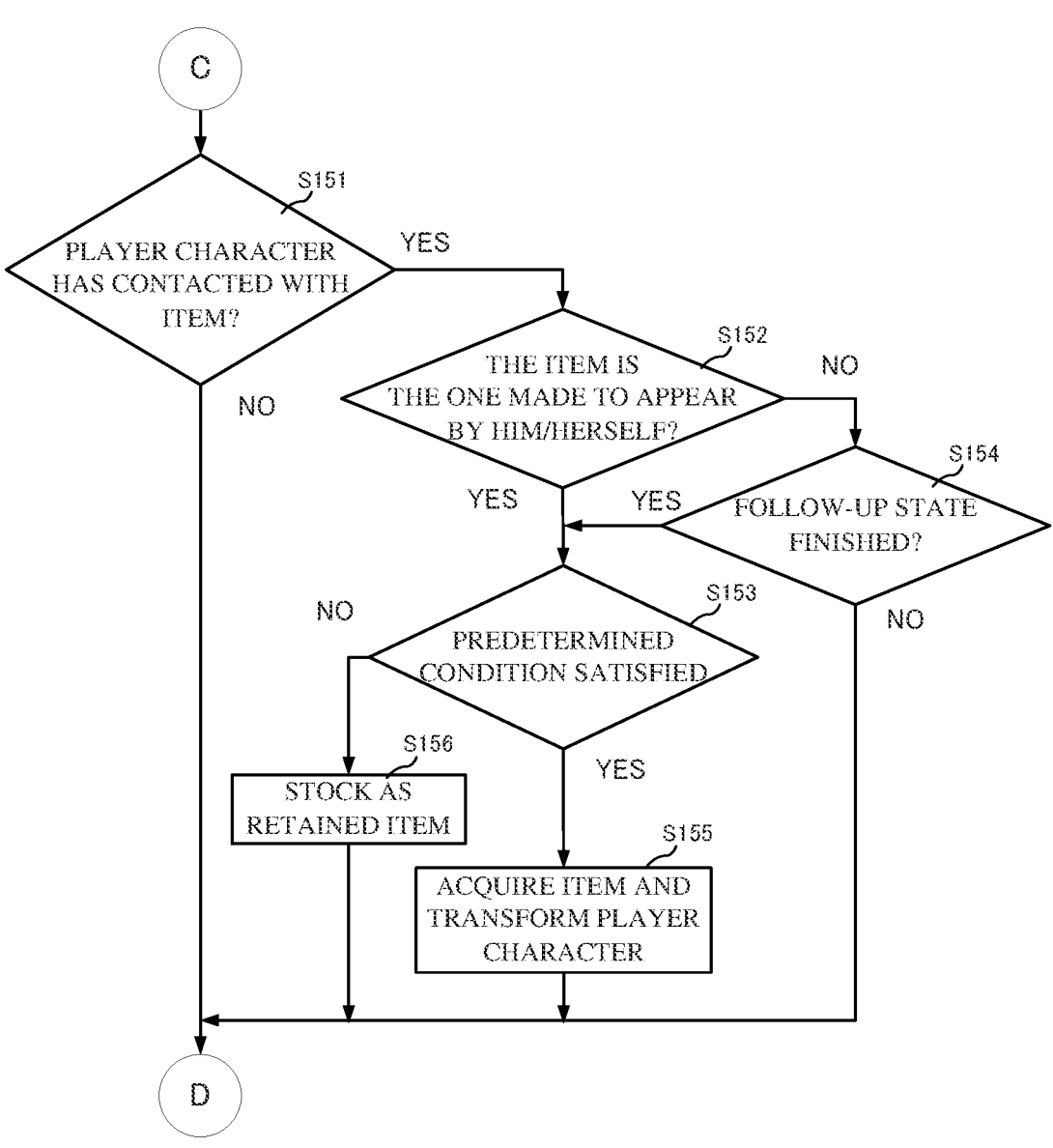
FIG. 13 shows a non-limiting example of a flowchart of game processing.

FIG. 12 and FIG. 13 show examples of flowcharts of the item process in a case where the game is executed in offline multi-play in the game progress processing S100 in FIG. 9.

In step S131 in FIG. 12, the processor 81 determines whether or not a hold-down operation on the A button has been performed by any player, on the basis of the operation data 410. Specifically, the processor 81 determines that a hold-down operation has been performed, when the continuous pressing time for the A button has reached a predetermined period (e.g., 0.3 seconds) or longer. If the determination result is YES in step S131, the process proceeds to step S132, and if the determination result is NO, the process proceeds to step S138.

In step S132, the processor 81 determines whether or not there is a shared retained item (see 204, etc., in FIG. 6). If the determination result is YES in step S132, the process proceeds to step S133, and if the determination result is NO, the process proceeds to step S138.

In step S133, on the basis of the operation data 410 and the like, the processor 81 displays a balloon above the head (upward) of the player character of the player who has performed the hold-down operation, with the size of the balloon corresponding to the duration of the hold-down operation determined in step S131, and moves the balloon so as to follow movement of the player character (see (b) and (c) in FIG. 7). In addition, the processor 81 displays a hold-down gauge with its length corresponding to the duration of the hold-down operation (see (b) and (c) in FIG. 7). Then, the process proceeds to step S134.

In step S134, the processor 81 determines whether or not the hold-down operation determined in step S131 has continued for 1.3 seconds, on the basis of the operation data 410. If the determination result is YES in step S134, the process proceeds to step S135, and if the determination result is NO, the process proceeds to step S136.

In step S135, on the basis of the object data 403 and the like, the processor 81 eliminates the retained item stocked at the earliest timing among the retained items determined to be present in step S132, makes the corresponding item appear at the position of the balloon, and eliminates the balloon (see (c) and (d) in FIG. 7). In addition, the processor 81 provides a light-emitting effect to the item made to appear, displays the item above the head (upward) of the player character, and moves the item so as to follow left-right (horizontal) movement of the player character (see (d) and (e) in FIG. 7). Further, the processor 81 eliminates the hold-down gauge at the same time as making the item appear. As described with reference to (d) and (e) in FIG. 7, only the player character that has made the item appear can acquire the item provided with the light-emitting effect above the head by jumping. Then, the process proceeds to step S138.

In step S136, the processor 81 determines whether or not the hold-down operation determined in step S131 has been canceled, on the basis of the operation data 410. If the determination result is YES in step S136, the process proceeds to step S137, and if the determination result is NO, the process returns to step S133.

In step S137, the processor 81 eliminates the balloon displayed in step S133. Then, the process proceeds to step S138.

In step S138, the processor 81 determines whether or not there is an item following the player character, on the basis of the object data 403 and the like. If the determination result is YES in step S138, the process proceeds to step S139, and if the determination result is NO, the process proceeds to step S151 in FIG. 13.

In step S139, the processor 81 determines whether or not 1.5 seconds has elapsed since appearance of the item (item present in the virtual space) determined to be present in step S138, on the basis of the object data 403 and the like. Then, if it is determined in step S139 that 1.5 seconds has elapsed (YES), the process proceeds to step S140.

In step S140, the processor 81 eliminates the light-emitting effect provided to the item determined in step S138, finishes the follow-up movement of the item to the player character, and floats the item at the finish position (see (e) and (f) in FIG. 7). Then, the process proceeds to step S151 in FIG. 13.

In step S151, the processor 81 determines whether or not any player character has contacted with any item. If the determination result is YES in step S151, the process proceeds to step S152, and if the determination result is NO, the process returns to step S131 in FIG. 12.

In step S152, the processor 81 determines whether or not the item determined to have contacted in step S151 is an item made to appear by the player character determined to have contacted in step S151. If the determination result is YES in step S152, the process proceeds to step S153, and if the determination result is NO, the process proceeds to step S154.

In step S154, the processor 81 determines whether or not the state of following the player character has finished, regarding the item determined to have contacted in step S151. If the determination result is YES in step S154, the process proceeds to step S153, and if the determination result is NO, the process returns to step S131 in FIG. 12.

In step S153, the processor 81 determines whether or not a predetermined condition has been satisfied. The predetermined condition is that a strength level to be imparted by the item (item to be acquired) determined to have contacted in step S151 is higher than the present strength level of the player character determined to have contacted in step S151. If the determination result is YES in step S153, the process proceeds to step S155, and if the determination result is NO, the process proceeds to step S156.

In step S155, the processor 81 performs processing in which the player character determined to have contacted in step S151 acquires the item determined to have contacted in step S151, and the player character gains a strength and transforms into an outer appearance (form) in accordance with the item. In addition, the processor 81 eliminates the item. Then, the process returns to step S131 in FIG. 12.

In step S156, the processor 81 stocks the item determined to have contacted in step S151, as a retained item, and displays the item in the retained item box (see 211 in FIG. 6). Here, in a case where retained items have already been stocked in all the retained item boxes, the item determined to have contacted in step S151 is not stocked. Then, the process returns to step S131 in FIG. 12. In a case where the player character acquires the item in step S155, if the player character has already acquired an item (an item for a lower strength level than the item to be acquired) and the strength level of the player character has already increased, the already acquired item is stocked as a retained item (unless retained items have already been stocked to the upper limit).

As described above, according to the exemplary embodiment (see FIG. 5, FIG. 7, etc.), a player holds down the A button to make an item appear above the head of the own player character, and then during a predetermined period from the appearance (1.5 seconds), only the own player character can acquire the item by the player making the own player character jump, for example. At this time, in offline multi-play, the other players can see the item but cannot acquire the same, and in online multi-play, the other players cannot see the item and cannot acquire the same. This can prevent a problem that an item produced (made to appear) for the purpose of using the item for a player him/herself is taken away. Thereafter, whether online or offline, the item that has appeared comes into a state of being visible also to the other players and floating, so that any player character can acquire the item, whereby it is possible to pass the item to another player character. Thus, according to the exemplary embodiment, letting a player acquire an item for him/herself without another player acquiring the item, and letting a player pass an item to another player without the player acquiring the item for him/herself, can be achieved through a simple operation (operation on the A button). That is, in any case of "single-person play", "offline multi-play", "online multi-play", and "offline-online-mixed multi-play", it is possible to perform both of acquisition of an item and passing/receiving of an item through one kind of operation of holding down the A button, while suppressing competition for acquiring the item.

Modifications

In the above exemplary embodiment, the example in which the player character acquires an item by contacting with the item has been shown. However, without limitation thereto, for example, an item may be acquired by performing a predetermined operation (e.g., pressing the A button) when a player character contacts with the item.

In the above exemplary embodiment, the example in which online multi-play is performed by a plurality of game apparatuses connected via the Internet has been shown (see FIG. 4, FIG. 5, etc.). However, in multi-play performed by a plurality of game apparatuses directly connected through short-range wireless communication or the like not via the Internet, control may be performed in the same manner as in the case of the online multi-play described above.

In the above exemplary embodiment, the case where the sequential processing in the game processing is executed by a single game apparatus has been described. In another exemplary embodiment, the sequential processing may be executed in an information processing system including a plurality of information processing apparatuses. For example, in an information processing system including a terminal-side apparatus and a server-side apparatus that can communicate with the terminal-side apparatus via a network, a part of the sequential processing may be executed by the server-side apparatus. In an information processing system including a terminal-side apparatus and a server-side apparatus that can communicate with the terminal-side apparatus via a network, a major part of the sequential processing may be executed by the server-side apparatus and a part of the sequential processing may be executed by the terminal-side apparatus. In the information processing system, a server-side system may include a plurality of information processing apparatuses and processing to be executed on the server side may be executed by the plurality of information processing apparatuses in a shared manner. A configuration of so-called cloud gaming may be adopted. For example, the game apparatus may transmit operation data indicating a user's operation to a predetermined server, various game processing may be executed on the server, and the execution result may be distributed as a video and a sound by streaming to the game apparatus.

While the exemplary embodiments and modifications have been described above, it is to be understood that the above description is, in all aspects, merely an illustrative example, and is not intended to limit the scope thereof. In addition, it is to be understood that various improvements and changes can be made on the exemplary embodiments and modifications.

What is claimed is:

1. A non-transitory computer-readable storage medium having stored therein instructions that, when executed by a processor of an information processing apparatus for executing a multi-play game online or offline, cause the information processing apparatus to provide execution comprising:

controlling a first player character in a virtual space on the basis of an operation input by a first player;

causing a first item to appear in the virtual space on the basis of an operation input by the first player and generating the first item for display in the virtual space on a display associated with the first player;

causing the player character to acquire the first item on the basis of contact between the first player character and the first item;

detecting a continuous operation input by the first player;

after a predetermined period has elapsed since the appearance of the first item and after a period of time associated with the continuous operation input by the first player has elapsed, generating the first item for display in the virtual space on a display associated with another player, and on the basis of contact between the first item and another player character operated by the another player, causing the other player character to acquire the first item.

2. The non-transitory computer-readable storage medium according to claim 1, wherein the information processing apparatus is further caused to provide execution comprising:

causing the first item that has appeared to perform follow-up movement in accordance with movement of the first player character, and stopping the follow-up movement after the predetermined period has elapsed.

3. The non-transitory computer-readable storage medium according to claim 2, wherein the information processing apparatus is further caused to provide execution comprising:

causing the first item to appear above the first player character, and causing the first item to perform follow-up movement in a horizontal direction in accordance with horizontal movement of the first player character.

4. The non-transitory computer-readable storage medium according to claim 1, wherein the information processing apparatus is further caused to provide execution comprising:

on the basis of an operation input, causing the first item to appear when an operation of continuing to press a predetermined key of an operation device for a predetermined period is performed.

5. The non-transitory computer-readable storage medium according to claim 1, wherein the information processing apparatus is further caused to provide execution comprising:

when the first player character acquires an item in the game, retaining the item as a retained item if a predetermined condition is satisfied; and in a case where the retained item is retained, causing the retained item to appear as the first item on the basis of an operation input.

6. The non-transitory computer-readable storage medium according to claim 1, wherein the information processing apparatus is further caused to provide execution comprising:

executing the multi-play game offline;

causing a second item to appear in the virtual space on the basis of an operation input by the other player; and after a predetermined period has elapsed since appearance of the second item, on the basis of contact between the first player character and the second item, causing the first player character to acquire the second item.

7. The non-transitory computer-readable storage medium according to claim 1, wherein the information processing apparatus is further caused to provide execution comprising:

executing the multi-play game online;

not transmitting information on the first item to another information processing apparatus operated by the other player, until the predetermined period elapses from the appearance of the first item; and after the predetermined period has elapsed since the appearance of the first item, if the first item has not been acquired, transmitting information indicating a position of the first item to the other information processing apparatus.

8. The non-transitory computer-readable storage medium according to claim 7, wherein the information processing apparatus is further caused to provide execution comprising:

when the information about the position of the second item is received from the other information processing apparatus, placing the second item at the position in the virtual space; and causing the first player character to acquire the second item on the basis of contact between the first player character and the second item.

9. A game processing system for executing a multi-play game online or offline, the game processing system comprising:

a processor; and a memory configured to store computer readable instructions that, when executed by the processor, cause the game processing systems to:

control a first player character in a virtual space on the basis of an operation input by a first player;

cause a first item to appear in the virtual space on the basis of an operation input by the first player and generate the first item for display in the virtual space on a display associated with the first player;

cause the player character to acquire the first item on the basis of contact between the first player character and the first item;

detect a continuous operation input by the first player;

after a predetermined period has elapsed since the appearance of the first item and after a period of time associated with the continuous operation input by the first player has elapsed, generate the first item for display in the virtual space on a display associated with another player; and on the basis of contact between the first item and another player character operated by the another player, cause the other player character to acquire the first item.

10. The game processing system according to claim 9, wherein the game processing system is further caused to:

cause the first item that has appeared to perform follow-up movement in accordance with movement of the first player character, and stop the follow-up movement after the predetermined period has elapsed.

11. The game processing system according to claim 10, wherein the game processing system is further caused to:
cause the first item to appear above the first player character, and cause the first item to perform follow-up movement in a horizontal direction in accordance with horizontal movement of the first player character.

12. The game processing system according to claim 9, wherein the game processing system is further caused to:
on the basis of an operation input, cause the first item to appear when an operation of continuing to press a predetermined key of an operation device for a predetermined period is performed.

13. The game processing system according to claim 9, wherein the game processing system is further caused to:
when the first player character acquires an item in the game, retain the item as a retained item if a predetermined condition is satisfied; and
in a case where the retained item is retained, cause the retained item to appear as the first item on the basis of an operation input.

14. The game processing system according to claim 9, wherein the game processing system is further caused to:
execute the multi-play game offline;
cause a second item to appear in the virtual space on the basis of an operation input by the other player; and
after a predetermined period has elapsed since appearance of the second item, on the basis of contact between the first player character and the second item, cause the first player character to acquire the second item.

15. The game processing system according to claim 9, wherein the game processing system is further caused to:
execute the multi-play game online;
not transmit information on the first item to another information processing apparatus operated by the other player, until the predetermined period elapses from the appearance of the first item; and
after the predetermined period has elapsed since the appearance of the first item, if the first item has not been acquired, transmit information indicating a position of the first item to the other information processing apparatus.

16. The game processing system according to claim 15, wherein the game processing system is further caused to:
when the information about the position of the second item is received from the other information processing apparatus, place the second item at the position in the virtual space; and
cause the first player character to acquire the second item on the basis of contact between the first player character and the second item.

17. A game processing apparatus for executing a multi-play game online or offline, the game processing apparatus comprising:
a display; and

22 processing circuitry including at least one processor, wherein the processing circuitry is configured to:
control a first player character in a virtual space on the basis of an operation input by a first player;
cause a first item to appear in the virtual space on the basis of an operation input by the first player and generate the first item for display in the virtual space on a display associated with the first player;
cause the player character to acquire the first item on the basis of contact between the first player character and the first item;
detect a continuous operation input by the first player;
after a predetermined period has elapsed since the appearance of the first item and after a period of time associated with the continuous operation input by the first player has elapsed, generate the first item for display in the virtual space on a display associated with another player; and
on the basis of contact between the first item and another player character operated by the another player, cause the other player character to acquire the first item.

18. A game processing method executed by a processor configured to control a game processing system for executing a multi-play game online or offline, the game processing method comprising:
controlling a first player character in a virtual space on the basis of an operation input by a first player;
causing a first item to appear in the virtual space on the basis of an operation input by the first player and generating the first item for display in the virtual space on a display associated with the first player;
causing the player character to acquire the first item on the basis of contact between the first player character and the first item;
detecting a continuous operation input by the first player;
after a predetermined period has elapsed since the appearance of the first item and after a period of time associated with the continuous operation input by the first player has elapsed, generating the first item for display in the virtual space on a display associated with another player; and on the basis of contact between the first item and another player character operated by the another player, causing the other player character to acquire the first item.

19. The non-transitory computer-readable storage medium according to claim 1, wherein an object is displayed on a display of the first player during the continuous operation input by the first player.

20. The non-transitory computer-readable storage medium according to claim 1, wherein the first item is displayed on the display associated with the another player and the display associated with the first player after the predetermined period has elapsed since the appearance of the first item and after the period of time associated with the continuous operation input by the first player has elapsed.

* * * * *